United States Patent [19]

Masuda et al.

[11] Patent Number: 4,875,060

[45] Date of Patent: Oct. 17, 1989

[54] DISCHARGE HEAD FOR AN ELECTROSTATIC RECORDING DEVICE

[75] Inventors: Koji Masuda; Yuji Suemitsu; Kazuo Asano, all of Kanagawa, Japan

[73] Assignee: Fuji Xerox Co., Ltd., Tokyo, Japan

[21] Appl. No.: 275,865

[22] Filed: Nov. 25, 1988

[30] Foreign Application Priority Data

Nov. 27, 1987 [JP] Japan ................................ 62-297665

[51] Int. Cl.$^4$ ............................................ G01D 15/00

[52] U.S. Cl. ..................................... 346/155; 346/150

[58] Field of Search .................... 346/155, 159, 139 C; 400/119; 250/423 R, 423 F; 358/295

[56] References Cited

U.S. PATENT DOCUMENTS 4,546,364 10/1985 Todoh ................................. 346/155

4,697,196 9/1987 Inada et al. ......................... 346/158

*Primary Examiner*—Arthur G. Evans

*Attorney, Agent, or Firm*—Finnegan, Henderson, Farabow, Garrett, & Dunner

[57] ABSTRACT

A discharge head for electrostatically recording an image on a recording body including a first insulation layer having a first side and a second side, a plurality of linear extending discharge electrodes disposed on the first side, an induction electrode disposed on the second side, and a second insulation layer disposed to cover all but the tips of the discharge electrodes. The discharge head may also include a insulating substrate layer laminated on the side of the induction electrode opposite the first insulation layer. In addition, the induction electrode may contain a plurality of spaced apart protrusions extending in a direction parallel to the discharge electrodes.

21 Claims, 6 Drawing Sheets

DISCHARGE HEAD FOR AN ELECTROSTATIC RECORDING DEVICE

BACKGROUND OF THE INVENTION

1. Field of the Invention

The present invention relates to a discharge head for an electrostatic recording device used in machines such as printers, and facsimiles. In particular, the invention relates to a discharge head that generates charged particles (ions) and records images by means of the ions generated.

2. Description of the Related Art

There are various charge generating devices for use in electrostatic recording apparatuses. One such device is disclosed in U.S. Pat. No. 4,155,093 (Japanese Patent Laid Open No. 54-53537). As shown in FIG. 14, this device consists of a first set of electrodes 41 that are disposed on one side of a planar dielectric body 40. Numerous holes 42 for generating ions are formed on the first set of electrodes 41, as shown in FIG. 15, to form air gap regions 43 between the end face of the first set of electrodes 41 and the surface of the dielectric body 40. A second set of electrodes 44 are provided on the surface of the dielectric body 40 opposite the first set of electrodes 41. The surface of the dielectric body 40 on which the first set of electrodes 41 are disposed is arranged to face a recording body such as dielectric paper 45. Applying an AC voltage between the first set of electrodes 41 and the second set of electrodes 44 causes ions to be generated by a creeping discharge that is produced in the air gap region 43 along the surface of the dielectric body 40. The device is designed to record an image by electrostatically charging the surface of the dielectric paper 45 by generating ions and emitting them in a direction perpendicular to the creeping discharge (perpendicular to the surface of the dielectric body 40).

The prior art device has the following problems. First, since ions for electrostatically charging the dielectric paper 45 are emitted in a direction that is both perpendicular to the creeping discharge and perpendicular to the surface of the dielectric body 40, ion generation efficiency is lower than it would be if ions were emitted only in the direction of generation of the creeping discharge. Since it takes added time to generate the ions needed to charge the surface of the dielectric paper 45 to a predetermined potential, recording speed is substantially limited.

In addition, it is necessary to apply a high AC voltage to the first set of electrodes 41 and the second set of electrodes 44 in order to obtain the requisite ion charging. This increases creeping discharge and leads to electrical, chemical and thermal deterioration of the electrodes 41 and 44, and the dielectric body 40. In addition, ion generation becomes difficult due to an increase in compounds generated by the discharge that attach to the first set of electrodes 41 and prevent the device from being stably used for an extended period of time.

Moreover, since image recording is carried out by disposing the the first set of electrodes 41 on one side of the dielectric body 40 to contact a recording body 47, the area of the recording part has to be increased. For this reason, in a device that makes use of a drum-like recording body, the area of the recording part is increased so that the ratio of the area of the recording part to the area of the surrounding recording body drum 47 becomes large, as shown in FIG. 16. This results in a large sized recording device.

The applicants of the present invention have already proposed (Japanese Patent Application No. 62-212958), a device intended to solve the above-mentioned problems. This previous electrostatic recording device (not prior art) was designed to (1) carry out recording at high speed by generating ions efficiently, (2) prolong the life of the recording device by lowering the voltage necessary for generating the creeping discharge and thereby prevent deterioration of the electrodes and the dielectric members, and (3) miniaturize and make compact the recording head.

As shown in FIG. 17 and FIG. 18, the above-mentioned device has a discharge head 53 wherein a first set of electrodes 50 each have a linear form and are embedded in a solid dielectric substrate 51. The first set of electrodes 50, are disposed at predetermined intervals from each other and have their tips exposed. A second electrode 52 is embedded on the reverse side of the dielectric substrate to perpendicularly intersect the tips of the first set of electrodes 50, and form a spatial region G for generating a creeping corona discharge between the tips of the first set of electrodes 50 and the solid dielectric substrate 51. Recording of electrostatic images is accomplished by arranging the disk head 53 so that the tips of the first set of electrodes 50 face a recording body (not shown), and applying an AC voltage between the first set of electrodes 50 and the second electrode 52 to generate a creeping corono discharge R that extends from the tips of the first set of electrodes 50 to the second electrode 52 via the surface of the solid dielectric substrate 51. However, this proposed device has the following drawbacks. The first set of electrodes 50 extend linearly toward the recording body, whereas the second electrode 52 is disposed so as to perpendicularly intersect the first electrodes at their tips. Due to this arrangement, a voltage applied between the first and second electrodes 50 and 52, causes the resulting creeping corona discharge R to spread as shown in FIG. 19. This results in a spreading of the image recorded by the first set of electrodes 50 and a lowering of the resolution of the image. In addition, cross-talk occurs due to adjacent electrodes 50 simultaneously discharging ions.

SUMMARY OF THE INVENTION

An object of the present invention is to resolve the difficulties mentioned above by providing an improved discharge head for electrostatically recording images.

Another object of the present invention is a discharge head having improved resolution.

These and other objects are accomplished by a discharge head for use in electrostatically recording an image on a recording body comprising a first insulation layer having a first side and a second side, a plurality of discharge electrodes disposed on the first side of the first insulation layer, each of the electrodes having a tip end, and an induction electrode disposed on the second side of the first insulation layer, and a second insulation layer disposed on the discharge electrodes to cover all but the tip ends of the discharge electrodes.

BRIEF DESCRIPTION OF THE DRAWINGS

The accompanying drawings, which are incorporated in and constitute a part of the specification, illustrate several embodiments of the invention, and together with the description, serve to explain the principles of the invention.

DETAILED DESCRIPTION

The discharge head of the present invention is capable of improving resolution by preventing the spreading of individual discharges and eliminating interference such as cross-talk. The electrostatic recording device of the present invention includes a first insulation layer disposed between a discharge electrode and an induction electrode. The discharge electrode extends straight and is covered with a second insulation layer. The induction electrode overlaps the discharge electrode and has projections that extend in the same direction.

The first and second insulation layers may be made of synthetic resin such as Bakelite and glass epoxy resin, ceramics such as alumina or zirconia, or inorganic material such as glass or mica. In addition, since many discharge electrode strips may be disposed linearly and parallel to each other on the surface of the first insulation layer, the discharge electrode can be formed by either etching a thin metal plate such as stainless steel or nickel or by printing on electrode pattern on the surface of the first insulating layer. The printing method may employ a paste-like ink consisting of materials such as tungsten or silver.

Moreover, the induction electrode may be embedded in the reverse side of the first insulation layer corresponding to the positions of the tips of the discharge electrode. The induction electrode, may be formed in a comb-like shape with recesses and projections, or may be formed in other shapes.

In the present invention, the induction electrode provided with projections, overlaps and extends in the same direction as the discharge electrode. Therefore, it is possible to prevent interference such as cross-talk between neighboring discharges and improve the image resolution. In addition, creeping corona discharge generated between the discharge electrodes and the induction electrode extends only in the direction of the induction electrode projections.

Figure 1:
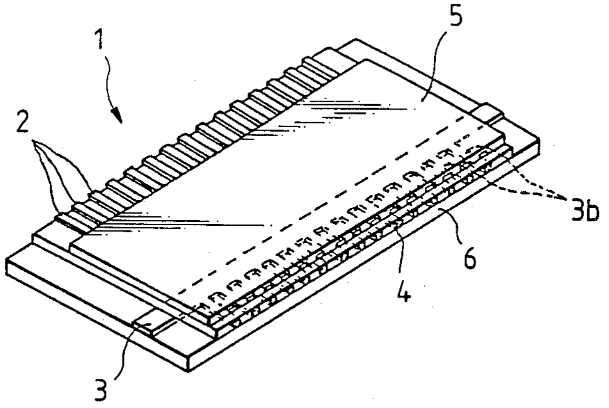
FIG. 1 is a perspective view of a first embodiment of a discharge head in accordance with the present invention.
Figure 2:
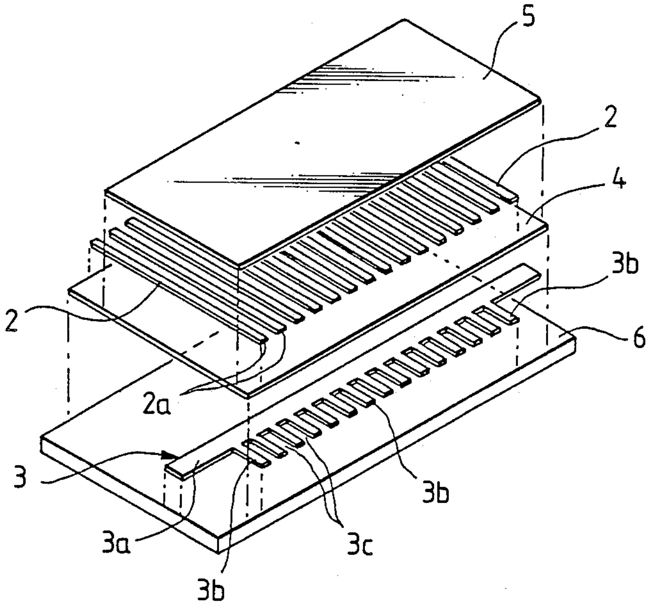
FIG. 2 is an exploded view of the discharge head of FIG. 1.

FIG. 1 and FIG. 2 show an embodiment of a discharge head in accordance with the present invention. A first insulation layer 4 is disposed between discharge electrodes 2 and induction electrode 3 in discharge head 1. The first insulation layer 4 is flat and made of a solid dielectric material. On the surface of the first insulation layer 4, a plurality of discharge electrodes 2 are disposed to extend linearly in a widthwise or latitudinal direction of the insulation layer 4. The discharge electrodes 2 are disposed in parallel with one another and aligned in a longitudinal direction of the insulation layer 4 perpendicular to the longitudinal direction. The tips **2*a* of the discharge electrodes 2 are set back from the edge of the first insulation layer 4 aligned in the longitudinal direction of the first insulation layer 4. Spatial regions G (FIG. 3) are formed between the end faces of the tips 2*a* of the discharge electrodes 2 and the surface of the insulation layer 4** for generating creeping discharge.

Further, a second insulation layer 5 is provided on the side of the discharge electrodes 2 opposite the first insulation layer 4 to cover all but the tips **2*a* of the discharge electrodes 2. The second insulation layer 5 has a length equal to, and a width slightly smaller than, the first insulation layer 4. The second insulation layer 5 is laminated on the first insulation layer 4 and the discharge electrodes 2 and has an edge coplanar with the end faces of the tips 2*a* of the discharge electrodes 2**.

An induction electrode 3 is disposed in a longitudinal direction on the surface of the first insulation layer 4 opposite the discharge electrodes 2. The induction electrode 3 is covered by an insulating substrate 6, which is equal in width to the first insulation layer 4 and slightly longer. The induction electrode 3 has a linear part **3*a* that extends in the longitudinal direction of the insulating substrate 6 and projections 3*b* that protrude from one side of the linear part 3*a*. The projections 3*b* extend parallel to and overlap the discharge electrodes 2. The induction electrode 3 has a comb-like shaped formed by the projections 3*b* and recesses 3*c* between the projections 3*b*. These projections 3*b* extend to a portion corresponding to the tips 2*a* of the discharge electrodes 2**.

The first and second insulation layers 4 and 5 and the insulating substrate 6 have a thin plate-like shape and may be formed by sintering a ceramic material such as alumina or zirconia. Discharge electrodes 2 are printed on the first insulation layer using a paste-like ink consisting of materials such as tungsten or silver. The induction electrode 3 is printed on the ceramic material of the insulating substrate 6 using the same paste-like ink. Both sets of electrodes are disposed in accordance with predetermined patterns.

After the second insulation layer 5 is laminated on the first insulation layer 4, the insulating substrate 6 is laminated on the first insulation layer 4 as shown in FIG. 1. The layers can be laminate through a process of sintering at a temperature in the range of 1500° to 1800° C.

In accordance with the present invention, the discharge head 1 is not limited to the type described above. The insulative substrate and the first and second insulation layers may be formed using a synthetic resin such as Bakelite, a glass epoxy, or an inorganic material such as glass or mica. The discharge head 1 system may be manufactured by using a method in which the discharge electrodes 2 or the induction electrodes 3, are formed in their predetermined shape by etching a thin metallic plate such as stainless steel or nickel. The electrodes 2 and 3 can then be affixed to the insulative substrate 6 and the first insulation layer 4 through a method such as bonding, and the remaining layers can then be bonded together in the order set forth above.

Figure 3:
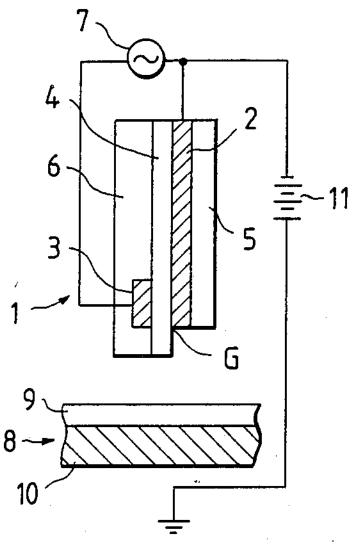
FIG. 3 is a cross-sectional diagram of the discharge head of FIG. 1.

As shown in FIG. 3, an AC power supply 7 is connected between the discharge electrodes 2 and the induction electrode 3. The AC voltage of the AC power supply 7 is applied between the discharge electrodes 2 and the induction electrode 3 and is arranged to be turned on and off in accordance with the image information. The AC voltage is sufficiently smaller than the breakdown voltage of the first insulation layer 4 and is set at a predetermined voltage that can produce a creeping corona discharge.

As depicted in FIG. 3, a recording body 8 is arranged at a position opposing the discharge head 1. The recording body 8 has a dielectric layer 9 on one surface, and an electrically conductive backing material 10 on its outer surface. A predetermined DC voltage is supplied by a DC power supply 11 between the discharge electrodes 2 and the conductive backing material 10.

The discharge head 1 is disposed at a position where the dielectric layer 9 of the recording body 8 is situated in the direction of generation of the creeping corona discharge from the discharge electrodes 1.

Figure 4:
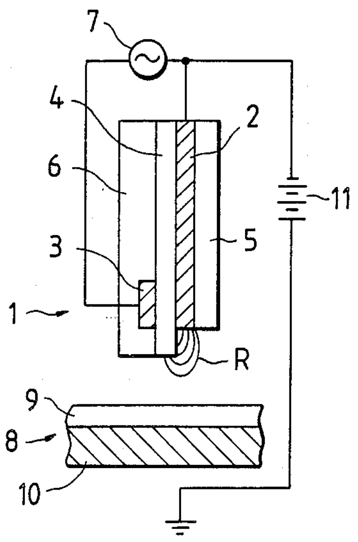
FIG. 4 is a cross-sectional view of the discharge head of FIG. 1 illustrating creeping corona discharge.

The recording of an electrostatic image using the discharge head 1 in accordance with the present invention is carried out as follows. An AC voltage corresponding to image information is applied between the discharge electrodes 2 and the induction electrode 3 through an AC power supply 7. When the voltage is greater than a prescribed value, there is a creeping corona discharge R generated in the spatial regions G formed by the exposed portions of the tips *2a* of the discharge electrodes 2 and the surface of the first insulation layer 4, as shown in FIG. 4. The induction electrode 3, acting as an auxiliary electrode, promotes ionization in the spatial regions G.

During one half cycle of the applied AC voltage, an electrostatic charge accumulates on the surface of the first insulation layer 4 by a creeping corona discharge R generated from the discharge electrodes 2. In the next half cycle, a voltage inverse to that of the accumulated charge is applied so that the difference in potential between the discharge electrodes 2 and the surface of the first insulation layer 4 is emphasized. During the second half cycle the creeping corona discharge R develops far from the discharge electrodes 2 along the surface of the insulation layer 4 toward the edge of the insulating substrate 6. A recording body 8 is disposed beyond the insulating substrate 6. An electric field is formed between the discharge head 1 and the recording body 8 to move the ions generated in the spatial regions G toward the side of the recording body 8. Ions with both positive and negative polarities corresponding to the specific print image are moved by the electric field. This electric field is created between the conductive backing material 10 of the receiving body 8 and the discharge electrodes 2 by a DC voltage applied by the DC power supply 11.

Next, recording of an electrostatic image of ions is recorded on the recording body 8 by a scanning process. During the scanning process the space between the recording body 8 and the discharge head 1 is kept constant, and either one or both of the AC voltage and the DC voltage supplies are turned on and off.

As described above, spatial regions G are formed between the discharge electrodes 2 and the first insulation layer 4 for generating a creeping discharge. The discharge head 1 is arranged at a position where the dielectric layer 9 of the recording body 8 is located in the direction of the creeping corona discharge R from the discharge electrodes 2. Accordingly, when an AC voltage is applied between the discharge electrodes 2 and the induction electrode 3, the creeping corona discharge R develops along the surface of the first insulation layer 4, and the ions formed by the creeping corona discharge R are emitted in the direction of the creeping corona discharge R. The configuration of the instant invention allows ions to be emitted efficiently in the direction of the recording body 8 by the creeping corona discharge R. As a result, it becomes possible to generate ions efficiently and to write images rapidly to the recording body 8 so that fast recording becomes possible.

In addition, since it is possible to generate ions efficiently, a lower voltage can be applied. Therefore, it is possible to prevent deterioration of the discharge electrodes 2 and 3 and the first insulation layer 4 that may be caused by the discharge. This serves to prolong the life of the discharge head 1.

Figure 6:
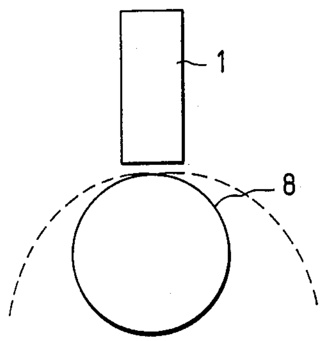
FIG. 6 is a schematic diagram showing the relationship between the discharge head of FIG. 1 and a recording drum.
Figure 16:
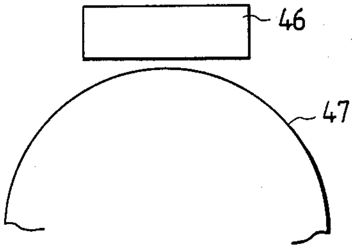
FIG. 16 PRIOR ART
FIG. 16 is a schematic diagram showing the relationship between the device of FIG. 14 and the recording drum body.
Figure 17:
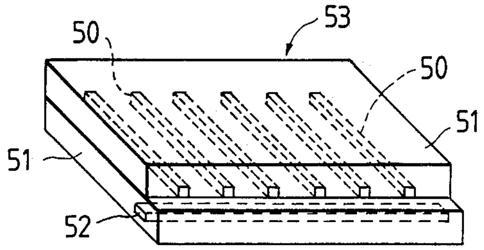
FIG. 17 is a perspective view of the present inventors' proposed discharge head.
Figure 18:
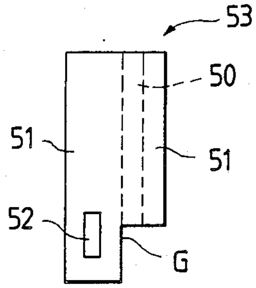
FIG. 18 is a side view of the discharge head of FIG. 17.
Figure 19:
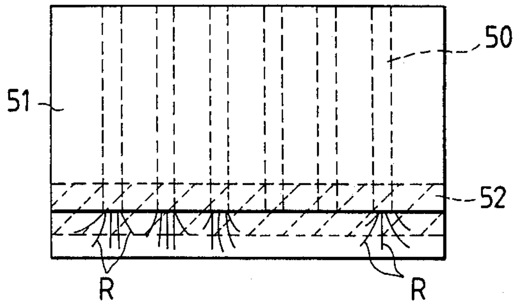
FIG. 19 is a front view of the discharge head of FIG. 17.

Since, the first insulation layer 4 is disposed between the discharge electrodes 2 and the induction electrode 3, and the recording body 8 is disposed in the direction of the creeping corona discharge, it is possible to form a thin discharge head 1. Therefore, when a drum-like recording body 8 is used, it is possible to make the diameter of the drum small, as shown in FIG. 6, as compared to the device shown in FIG. 16. This enables the production of a compact electrostatic recording device.

Figure 5:
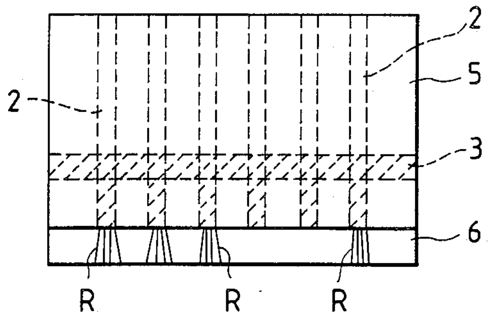
FIG. 5 is a front view of the discharge head of FIG. 1.

The induction electrode 3 overlaps the discharge electrodes 2 and possesses projections *3b* that extend in the same direction as the discharge electrodes 2. Therefore, as shown in FIG. 5, creeping corona discharge R from the discharge electrodes 2 and the resulting ion particle flux grow only in the longitudinal direction of the discharge electrodes 2 without spreading sideways. Consequently, it is possible to improve the resolution of the resulting ion particle flux, enabling sharper electrostatic images. Moreover, since the ion particle flux can be restricted as stated above, interference between ion flow fluxes emitted by adjacent discharge electrodes 2 can be prevented, precluding the occurrence of the cross-talk.

Figure 7:
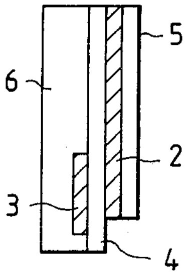
FIG. 7 is a cross-sectional view of a second embodiment of the discharge head of the present invention.
Figure 8:
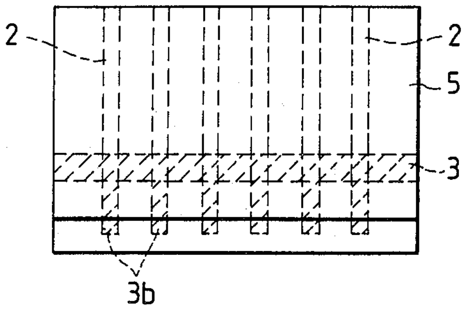
FIG. 8 is a front view of the discharge head of FIG. 7.

FIG. 7 and FIG. 8 show another embodiment of the discharge head in accordance with the present invention. In this embodiment, the tips of the projections *3b* of the induction electrode 3 extend nearer to the edge of the insulating substrate 6 than the tips *2a* of the discharge electrodes 2. With this arrangement, creeping corona discharge R is generated from the discharge electrode 2 toward the induction electrode 3 and can be guided closer to the edge of the insulating substrate 6. Therefore, the creeping corona discharge R can be more easily extended toward the recording body 8, and ion particle flux spreading can further be restricted, leading to improved recording. Other features of this embodiment are identical to those of the previous embodiment.

Figure 9:
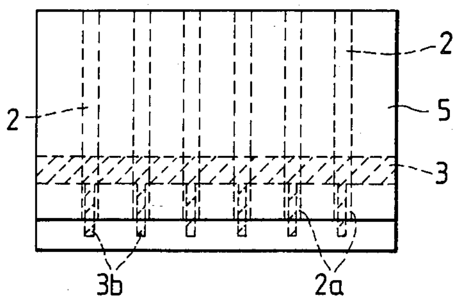
FIG. 9 is a front view of a third embodiment of the discharge head of the present invention.

FIG. 9 depicts a third embodiment of the recording head in accordance with the present invention. In this embodiment the projections 3*b* of the induction electrode 3 are narrower than the discharge electrodes 2. If the width of the tips 2*a* of the discharge electrodes 2 are also smaller, the region of the creeping corona discharge R will be more narrow, reducing the efficiency of ion generation. However, when only the width of the projections 3*b* of the induction electrode 3 is narrowed, as shown in FIG. 9, ion generation efficiency is barely effected. In the third embodiment, the ion particle flux concentrates on the projections 3*b* of the induction electrode 3 so that the flux of ion particles is further restricted, making it possible to produce higher resolution recordings. Other features of this embodiment are identical to those of the previous embodiments.

Figure 10:
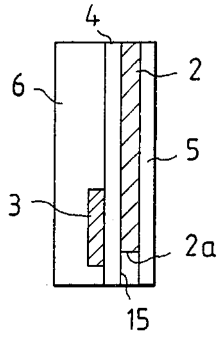
FIG. 10 is a cross-sectional diagram illustrating a fourth embodiment of the discharge head of the present invention.
Figure 11:
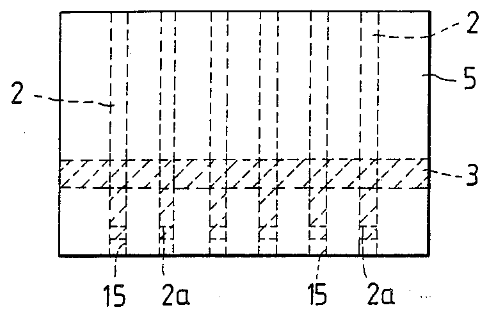
FIG. 11 is a front view of the discharge head of FIG. 10.

A fourth embodiment of the present invention is depicted in FIGS. 10 and 11. In this embodiment, the second insulation layer 5 has the same width as that of the first insulation layer 4, defining a linear space 15 at the tip 2*a* of the discharge electrode 2. This space 15 extends from the end faces of the discharge electrodes 2 to the end faces of the first and second insulation layers 4 and 5, exposing the tips 2*a* of the discharge electrodes 2. Therefore, the creeping corona discharge R of the discharge electrodes 2 develops only within the linear space 15. This minimizes the spreading of the flux of ionic particles, and prevents interference between neighboring discharge electrodes to permit high resolution recording. Other features of the fourth embodiment are identical to those of the previous embodiments.

Figure 12:
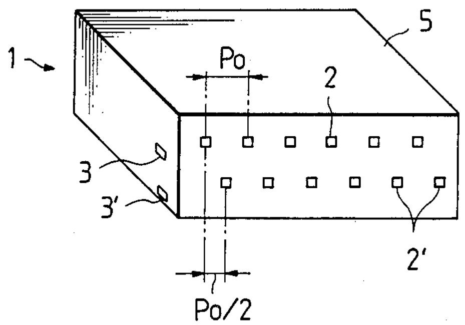
FIG. 12 is a perspective view of a fifth embodiment of the discharge of the present invention.
Figure 13:
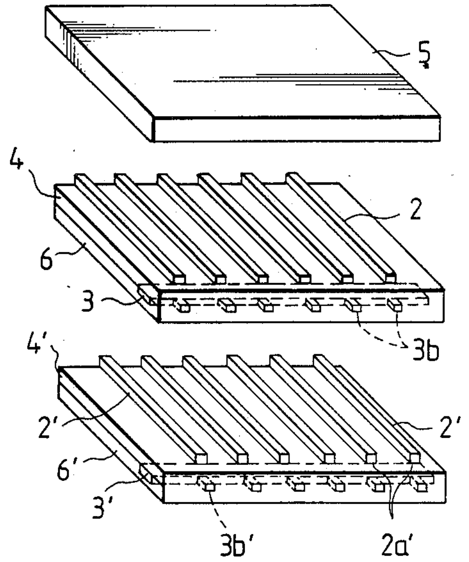
FIG. 13 is an exploded view of the discharge head of FIG. 12.
Figure 14:
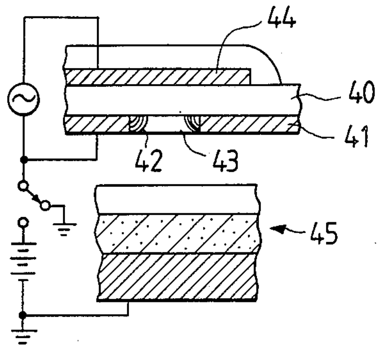
FIG. 14 PRIOR ART
FIG. 14 is a cross-sectional diagram showing the charged particle generating device used in conventional prior art electrostatic recording devices.
Figure 15:
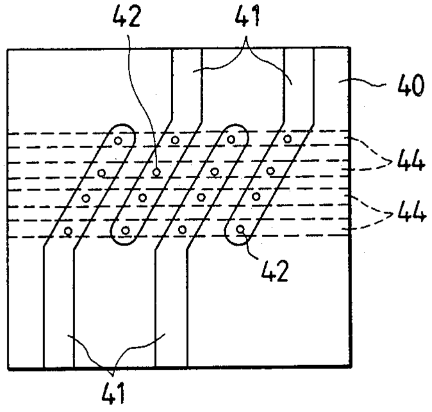
FIG. 15 PRIOR ART
FIG. 15 is a front view of the device of FIG. 14.

A fifth embodiment is shown in FIGS. 12 and 13. In this embodiment, two sets of discharge electrodes 2 and an induction electrode 3 are laminated to form one discharge head 1. In addition, the discharge electrodes of each set are staggered from each other to avoid overlap. More specifically, the discharge head 1 has two sets of first insulation layers 4 and 4′, and two sets of discharge electrodes 2 and 2′ formed with a predetermined pitch Po. The first insulation layers 4 and 4′ are laminated with their respective discharge electrodes 2 and 2′ displaced by a distance Po/2 in order to avoid overlap. The projections 3*b* and 3*b*′ of the induction electrodes 3 and 3′ are arranged on the opposite side of the first insulation layer 4 and 4′ respectively and are disposed at positions that correspond to the respective discharge electrodes 2 and 2′. When a plurality of sets of discharge electrodes 2 and the induction electrode 3 (the case of two sets is shown in the example) are provided in one discharge head 1 and are laminated in a staggered fashion so as to avoid overlap, it is possible to improve the recording accuracy of electrostatic images, enabling recording with high resolution. Other features of the fifth embodiment are identical to the previous embodiment so that no further description will be given.

What is claimed is:

1. A discharge head for use in electrostatically recording an image on a recording body comprising:
 a first insulation layer having a first side and a second side;
 a plurality of discharge electrodes disposed on said first side of said first insulation layer, each of said electrodes having a tip end;
 an induction electrode disposed on said second side of said first insulation layer; and
 a second insulation layer disposed on said discharge electrodes to cover all but the tip ends of said discharge electrodes.

2. A discharge head as set forth in claim 1, wherein said first insulation layer is formed of a dielectric material.

3. A discharge head as set forth in claim 1, wherein said discharge electrodes extends linearly and parallel to each other and are aligned in the longitudinal direction of the print head.

4. A discharge head as set forth in claim 1, wherein the tip ends of the discharge electrodes are set back from an edge of the first insulation layer.

5. A discharge head as set forth in claim 1, wherein the second insulation layer has a length equal to, and a width slightly smaller than corresponding dimensions of the first insulation layer and covers all of said discharge electrodes except for said tip ends.

6. A discharge head as set forth in claim 1, wherein the induction electrode has a linear portion and a plurality of spaced apart parallel projections, said linear portion extending in the longitudinal direction of the discharge head and said plurality of projections extending from said linear portion in a perpendicular direction thereto.

7. A discharge head as set forth in claim 6, further comprising an insulating substrate formed on the side of the induction electrode opposite said first insulation layer.

8. A discharge head as set forth in claim 6, wherein said plurality of projections of said induction electrode extend to a portion corresponding to said tip ends of said discharge electrodes.

9. A discharge head as set forth in claim 7, wherein said first and second insulation layer and said insulating substrate are made of a ceramic material.

10. A discharge head as set forth in claim 1, wherein said discharge electrodes are printed on the first side of the first insulation layer using ink containing materials chosen from the group consisting of tungsten and silver.

11. A discharge head as set forth in claim 7, wherein the induction electrode is printed on the insulation substrate using ink containing materials chosen from the group consisting of tungsten and silver.

12. A discharge head as set forth in claim 7, wherein said first and second insulation layers and said insulative substrate include insulators chosen from the group consisting of synthetic resin, glass epoxy, and inorganic material.

13. A discharge head as set forth in claim 1, wherein said discharge electrodes and said induction electrodes are formed of an etched thin metal plate.

14. A discharge head as set forth in claim 1, further including means for connecting an AC power source to the discharge head to create a difference in potential between the discharge electrodes and the induction electrode.

15. A discharge head as set forth in claim 1, further comprising means cooperating with said discharge electrodes for creating a difference in DC voltage potential between said discharge electrodes and the recording body.

16. A discharge head as set forth in claim 6, wherein the projections of the induction electrode extend nearer to the edge of the insulating substrate than do the tip ends of the discharge electrodes.

17. A discharge head as set forth in claim 6, wherein the projections of the induction electrode are narrower in width than said discharge electrodes.

18. A discharge head as set forth in claim 1, wherein said first and second insulation layers have substantially the same width.

19. A discharge head as set forth in claim 6, further comprising at least one additional discharge head disposed on the surface of the insulating substrate opposite the induction electrode, said additional discharge head including an additional plurality of discharge electrodes laminated on the insulating substrate, an additional first insulation layer laminated on the additional discharge electrodes, additional induction electrodes laminated on the additional first insulation layer, and an additional insulating substrate laminated on the additional induction electrodes.

20. A discharge head as set forth in claim 19, wherein said additional layer of discharge electrodes are staggered from the first set of discharge electrodes to avoid overlap.

21. A discharge head as set forth in claim 19, wherein said projections of said additional induction electrodes are staggered from the projections of the first induction electrode to avoid overlap.

* * * * *